(12) United States Patent
Gassner

(10) Patent No.: US 9,970,518 B2
(45) Date of Patent: May 15, 2018

(54) DRIVING BLOCK FOR CONNECTIONS

(71) Applicant: LIMOSS (SHENZHEN) CO., LTD, Shenzhen, Guangdong (CN)

(72) Inventor: Christian Gassner, Guangdong (CN)

(73) Assignee: LIMOSS (SHENZHEN) CO., LTD, Shenzhen (CN)

( * ) Notice: Subject to any disclaimer, the term of this patent is extended or adjusted under 35 U.S.C. 154(b) by 161 days.

(21) Appl. No.: 15/080,618

(22) Filed: Mar. 25, 2016

(65) Prior Publication Data
US 2017/0167583 A1 Jun. 15, 2017

(30) Foreign Application Priority Data
Dec. 9, 2015 (CN) ..................... 2015 2 1014887 U

(51) Int. Cl.
*F16H 25/20* (2006.01)
*A47C 17/04* (2006.01)
*A47C 17/86* (2006.01)
*F16M 13/02* (2006.01)

(52) U.S. Cl.
CPC ............. *F16H 25/20* (2013.01); *A47C 17/04* (2013.01); *A47C 17/86* (2013.01); *F16M 13/02* (2013.01); *F16H 2025/204* (2013.01)

(58) Field of Classification Search
CPC ... F16H 25/20; F16H 2025/204; A47C 17/86; A47C 17/04
See application file for complete search history.

(56) References Cited

U.S. PATENT DOCUMENTS

| 3,101,006 | A | * | 8/1963 | Kurt | E21B 19/24 173/160 |
| 4,696,512 | A | * | 9/1987 | Burnett | A47C 1/035 297/330 |
| 7,717,005 | B2 | * | 5/2010 | Wang | F16H 25/20 74/89.32 |
| 8,316,729 | B2 | * | 11/2012 | Schunke | F16H 25/20 74/89.23 |
| 2010/0044542 | A1 | * | 2/2010 | Koga | B60N 2/067 248/429 |
| 2014/0338480 | A1 | * | 11/2014 | Wu | F16H 25/20 74/89.23 |
| 2016/0273632 | A1 | * | 9/2016 | Lawson | F16H 25/20 |
| 2016/0327147 | A1 | * | 11/2016 | Gassner | F16H 57/025 |
| 2017/0214289 | A1 | * | 7/2017 | Gassner | H02K 7/06 |

FOREIGN PATENT DOCUMENTS

CN 103795180 A * 5/2014 ........... A47C 20/041

* cited by examiner

*Primary Examiner* — Jonathan P Masinick

(57) ABSTRACT

The present invention discloses a driving block for connections, used for connecting with external devices, and sliding on a sliding bracket, wherein, it comprises a connection part, used for connecting with the external device, and a sliding part, applied for sliding connection with the sliding bracket, the connection part is arranged on top of the sliding part, and fixedly connecting to the sliding part. The driving block for connections as provided in the present invention, after connecting to the external device, may achieve the upper and lower positions adjustment of the external devices through worm rotating, and the sliding part may connect to the sliding bracket through the lever, which ensures the stability of the connections.

5 Claims, 2 Drawing Sheets

DRIVING BLOCK FOR CONNECTIONS

CROSS-REFERENCE TO RELATED APPLICATIONS

This application claims the priority of Chinese patent application no. 201521014887.6 filed on Dec. 9, 2015, the entire contents of which are incorporated herein by reference.

FIELD OF THE INVENTION

The present invention relates to the field of technologies on driving blocks, and more particularly, to a driving block for connections.

BACKGROUND

Currently, among a plurality of internal structures applied for up and down adjustment in an existing medical equipment or a sofa seat in the prior art, the connection strength of a driving block is not strong enough, also, its connection stability is not sufficient enough, thus, when adjusting a sofa seat or a medical equipment up and down, its position is not very accurate. Therefore, the prior art needs to be improved and developed.

BRIEF SUMMARY OF THE DISCLOSURE

The technical problem to be solved in the present invention, aiming at the defects of the prior art, providing a driving block for connections, in order to solve the problem in the prior art that, the connection of current driving blocks is not stable enough.

In order to achieve the above said targets, the technical solution of the present invention is as follows:

A driving block for connections, used for connecting to an external device, and sliding on a sliding bracket, wherein, it comprises a connection part, used for connecting with the external device, and a sliding part, applied for sliding connection with the sliding bracket, the connection part is arranged on the top of the sliding part, and fixedly connecting with the sliding part.

The driving block for connections, wherein, the sliding part comprises a connection column, used for connecting with a worm, and a connection frame, used for connecting with the sliding bracket, the connection column comprises a through-hole, applied for the worm insertion.

The driving block for connections, wherein, the connection part comprises a connection hole, used for fixedly connecting with the external device.

The driving block for connections, wherein, a connection area between the connection part and the sliding part comprises a plurality of ribs, which are applied for reinforcement.

The driving block for connections, wherein, a threaded structure is arranged inside the connection column, applied for threaded connection with the worm.

The driving block for connections, wherein, a lever is arranged inside the connection frame, while the installation positions and the moving routes of the external devices are controlled by the lever.

The driving block for connections, wherein, the driving block for connections is made of polyformaldehyde (POM).

Benefits: the present embodiment discloses a driving block for connections, used for connecting with external devices, and slide on a sliding bracket, wherein, it comprises a connection part, used for connecting with the external device, and a sliding part, applied for sliding connection with the sliding bracket, the connection part is arranged on the top of the sliding part, and fixedly connecting to the sliding part. The driving block for connections as provided in the present application, after connecting to the external device, may achieve the upper and lower adjusting of the external devices through worm rotating, and the sliding part may connect to the sliding bracket by lever, which ensures the stability of the connections.

DETAILED DESCRIPTION

The present invention provides a driving block for connections, in order to make the purpose, technical solution and the advantages of the present invention clearer and more explicit, further detailed descriptions of the present invention are stated here, referencing to the attached drawings and some embodiments of the present invention. It should be understood that the detailed embodiments of the invention described here are used to explain the present invention only, instead of limiting the present invention.

Figure 1:
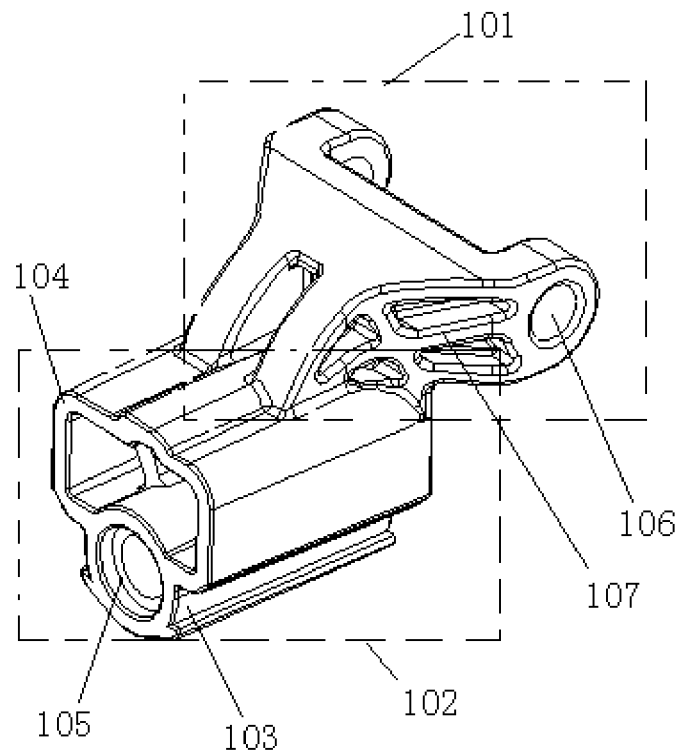
FIG. 1 illustrates a schematic diagram of a driving block for connections as provided in the present invention.
Figure 2:
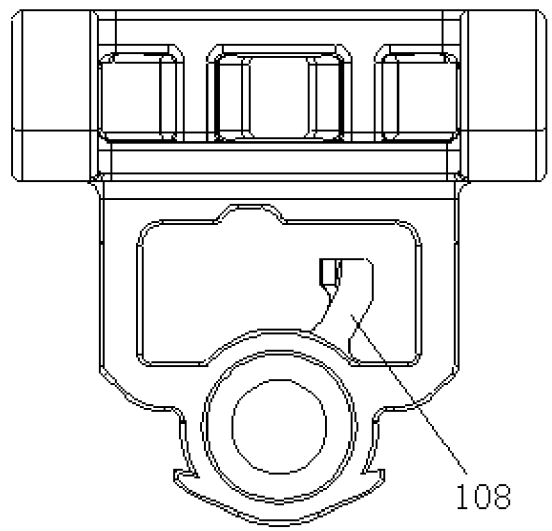
FIG. 2 illustrates a top view of a driving block for connections as provided in the present invention.
Figure 3:
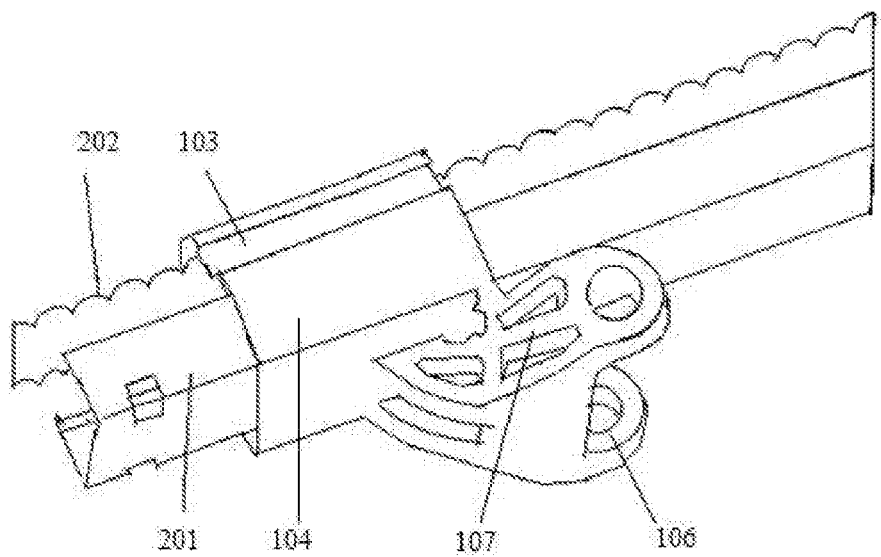
FIG. 3 illustrates a connection diagram of the driving block for connecting the worm and the sliding bracket, as provided in the present invention.

Referencing to FIG. 1 and FIG. 2 together, which are the schematic diagrams of the driving block for connections in different angles, and FIG. 3. The driving block for connections, used for connecting with an external device, and sliding on a sliding bracket 201, wherein, it comprises a connection part 101, used for connecting with the external device, and a sliding part 102, used for connecting with the sliding bracket 201 by sliding on it, the connection part 101 is arranged on the top of the sliding part 102, and fixedly connecting to the sliding part 102. The driving block for connections as provided in the present application, is used for connecting with external devices, including medical devices, sofa seats and else, which require upper and lower adjusting in using. In the present application, the driving block for connections comprises a connection part, used for connecting with the external devices, and a sliding part, applied for sliding connection with the sliding bracket, the connection part is arranged on the top of the sliding part, and fixedly connecting with the sliding part. The present application achieves adjusting positions upper and lower, through the combination of the connection part and the sliding part, which makes external devices including medical devices be able to slide on the sliding bracket.

Furthermore, the said sliding part 102 comprises a connection column 103, used for connecting with a worm 202, and a connection frame 104, used for connecting with the sliding bracket 201, the connection column 103 comprises a through-hole 105, applied for worm insertion. The said driving block for connections provided in the present application is shown in FIG. 3, which is a connection diagram of the driving block for connecting the worm 202 and the sliding bracket 201. The said sliding part is used for connecting with and sliding on the sliding bracket, in this way, the positions adjustment of the external devices including medical devices is achieved. More specifically, the said sliding part comprises a connection column and a connection frame, wherein, the said connection column is used for connecting with the worm, and the said connection frame is used for connecting with the sliding bracket. By rotating the worm, the driving block moves, and the positions adjustment of the external devices connecting to the driving block is then achieved.

Furthermore, the driving block for connections provided in the present application, wherein, the said connection part is used for connecting with the said external devices. Preferably, the said connection part comprises a connection hole 106, used for fixedly connecting with the said external devices. It is applicable to fix the external devices and the connection hole in the driving block for connections by screws, axle pins, or other methods, which makes both assembly and disassembly more convenient.

Furthermore, a connection area between the connection part 101 and the sliding part 102 comprises a plurality of ribs 107, which are applied for reinforcement purposes. The said driving block for connections as provided in the present application, wherein, the said connection part is fixedly connecting to the external devices, since the external devices need support, a certain strength is then required in the connection area, therefore, in the present application, a plurality of ribs for reinforcement are arranged in the connection area between the said connection part and the sliding part, which may increase the strength of the connection part.

Furthermore, a threaded structure is inside the connection column 103, applied for threaded connections with the worm. The said driving block for connections provided in the present application, wherein, the said connection column is connecting to the worm, and rotating the worm drives the driving block for connections to move, the said connection column comprises a threaded structure inside, which makes it possible to connect to a worm by threads, and through rotating the worm, the connection column is driven to move, thus achieving the positions adjustment of the driving block for connections, therefore, the positions of the external devices are also adjusted.

Furthermore, a lever 108 is arranged in the connection frame 104, which controls the installation positions and the moving routes of the external devices. The said driving block for connections as provided in the present application, comprises a positions-limiting switch on each of both left and right sides of the sliding bracket (no shown in the FIGs), the position of the driving block on left or right is controlled by a method of the lever pressing the switch on the left side or the right side, thus the installation positions and the moving routes of the connected external devices are controlled. The said connection frame connects to the sliding bracket, when adjusting the positions of the driving block for connections, rotating the worm and adjusting the driving block for connections to a proper position, it is needed to stabilize the said driving block for connections, therefore, pressing the positions-limiting switch and making the driving block for connections adjust to a proper position, ensures the stability of external devices including medical devices.

Furthermore, the said driving block for connections is made of POM. Since the said driving block for connections as provided in the present application is used for connecting with the said external devices including medical devices and sofa seats, thus it requires a certain strength and corrosion resistance, therefore, the said driving block for connections as provided in the present application, is preferably made of POM.

In summary, the present invention discloses a driving block for connections, used for connecting with external devices, and sliding on a sliding bracket, wherein, it comprises a connection part, used for connecting with the external device, and a sliding part, applied for sliding connection to the sliding bracket, the connection part is arranged on the top of the sliding part, and fixedly connecting with the sliding part. The driving block for connections as provided in the present invention, after connecting to the external device, may achieve adjusting the external devices upper and lower through worm rotating, and the sliding part may connect to the sliding bracket through the said lever, which ensures the stability of the connections.

It should be understood that, the application of the present invention is not limited to the above embodiments listed. It will be possible for a person skilled in the art to make modification or replacements according to the above descriptions, which shall all fall within the scope of protection in the appended claims of the present application.

What is claimed is:

1. A driving block for connections, used for connecting with an external device, and sliding on a sliding bracket, comprising a connection part, used for connecting with the external device, and a sliding part, applied for sliding connection with the sliding bracket, the connection part is arranged on top of the sliding part, and fixedly connecting with the sliding part;

wherein, the sliding part comprises a connection column, used for connecting with a worm, and a connection frame, used for connecting with the sliding bracket, the connection column comprises a through-hole, applied for the worm insertion; and wherein, a lever which is used to control a position of the driving block on the sliding bracket is arranged inside the connection frame.

2. The driving block for connections according to claim 1, wherein, the connection part comprises a connection hole, used for fixedly connection with the external device.

3. The driving block for connections according to claim 1, wherein, a connection area between the connection part and the sliding part comprises a plurality of ribs, applied for reinforcement.

4. The driving block for connections according to claim 1, wherein, a threaded structure is inside the connection column, applied for threaded connection with the worm.

5. The driving block for connections according to claim 1, wherein, the driving block for connections is made of polyformaldehyde.

\* \* \* \* \*